United States Patent
Deshpande et al.

(10) Patent No.: US 11,849,135 B2
(45) Date of Patent: *Dec. 19, 2023

(54) SYSTEMS AND METHODS FOR SIGNALING PICTURE ORDER COUNT VALUES FOR PICTURES INCLUDED IN CODED VIDEO

(71) Applicants: SHARP KABUSHIKI KAISHA, Sakai (JP); FG Innovation Company Limited, Tuen Mun (HK)

(72) Inventors: Sachin G. Deshpande, Vancouver, WA (US); Byeong-Doo Choi, Vancouver, WA (US)

(73) Assignees: SHARP KABUSHIKI KAISHA, Sakai (JP); FG Innovation Company Limited, Tuen Mun (HK)

(*) Notice: Subject to any disclaimer, the term of this patent is extended or adjusted under 35 U.S.C. 154(b) by 0 days.

This patent is subject to a terminal disclaimer.

(21) Appl. No.: 17/962,740

(22) Filed: Oct. 10, 2022

(65) Prior Publication Data

US 2023/0046741 A1    Feb. 16, 2023

Related U.S. Application Data

(63) Continuation of application No. 17/256,993, filed as application No. PCT/JP2019/025981 on Jun. 28, 2019, now Pat. No. 11,516,492.

(60) Provisional application No. 62/752,226, filed on Oct. 29, 2018, provisional application No. 62/739,059, filed on Sep. 28, 2018, provisional application No. 62/692,839, filed on Jul. 1, 2018.

(51) Int. Cl.
| | | |
|---|---|---|
| H04N 7/12 | (2006.01) | |
| H04N 19/46 | (2014.01) | |
| H04N 19/176 | (2014.01) | |
| H04N 19/184 | (2014.01) | |
| H04N 19/64 | (2014.01) | |
| H04N 19/127 | (2014.01) | |

(52) U.S. Cl.
CPC ........... *H04N 19/46* (2014.11); *H04N 19/127* (2014.11); *H04N 19/176* (2014.11); *H04N 19/184* (2014.11); *H04N 19/647* (2014.11)

(58) Field of Classification Search
CPC .................................................. H04N 19/127
See application file for complete search history.

(56) References Cited

FOREIGN PATENT DOCUMENTS

CN         104885469 A       9/2015

OTHER PUBLICATIONS

Notice of Allowance dated Jul. 13, 2022 for U.S. Appl. No. 17/256,993, which is the parent application of the instant application.

*Primary Examiner* — Y Lee
(74) *Attorney, Agent, or Firm* — ScienBiziP, P.C.

(57) ABSTRACT

A video device to determine picture count information for decoding video pictures is provided. The video device decodes a picture order count (POC) most significant bit (MSB) first flag that indicates whether a POC MSB second flag is present. When the POC MSB second flag is present, the video device decodes the POC MSB second flag indicating whether a POC MSB cycle element is present. When the POC MSB cycle element is present, the video device decodes the POC MSB cycle element that specifies a value of a POC MSB cycle. The value of the POC MSB cycle is used to compute a POC MSB value that is combined with a POC least significant bit (LSB) value to produce a POC value used for decoding a first video picture, and a length of the POC LSB value is based on a maximum POC LSB minus four value.

10 Claims, 6 Drawing Sheets

SYSTEMS AND METHODS FOR SIGNALING PICTURE ORDER COUNT VALUES FOR PICTURES INCLUDED IN CODED VIDEO

CROSS-REFERENCE TO RELATED APPLICATION(S)

This application is a continuation application of U.S. patent application Ser. No. 17/256,993, filed on Dec. 29, 2020, which is a National Stage application of International Application Serial No. PCT/JP2019/025981, filed on Jun. 28, 2019, which claims the benefit of and priority to U.S. Provisional Patent Application Ser. No. 62/692,839, filed on Jul. 1, 2018, U.S. Provisional Patent Application Ser. No. 62/739,059, filed on Sep. 28, 2018, and U.S. Provisional Patent Application Ser. No. 62/752,226, filed on Oct. 29, 2018. The contents of all of the above-mentioned applications are hereby incorporated herein fully by reference in their entirety.

FIELD

This disclosure relates to video coding and, more particularly, to techniques for signaling of pictures order count values in coded video.

BACKGROUND

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the 10$^{th}$ Meeting of ISO/IEC JTC1/SC29/WG11 16-20 Apr. 2018, San Diego, CA As a result of the multiple descriptions of video coding, a draft text of a video coding specification is described in "Versatile Video Coding (Draft 1)," 10$^{th}$ Meeting of ISO/IEC JTC1/SC29/WG11 16-20 Apr. 2018, San Diego, CA, document JVET-J1001-v2, which is incorporated by reference herein, and referred to as JVET-J1001.

Video compression techniques reduce data requirements for storing and transmitting video data by exploiting the inherent redundancies in a video sequence. Video compression techniques may sub-divide a video sequence into successively smaller portions (e.g., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (e.g., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY

In a first aspect of the present disclosure, a method of signaling picture count information includes: sending a picture order count most significant bit present flag indicating whether a picture order count most significant bit cycle element is present; and sending the picture order count most significant bit cycle element specifying a value of a picture order count most significant bit cycle if a value of the picture order count most significant bit present flag is equal to one, wherein a maximum value of the picture order count most significant bit cycle element is set by using a maximum picture order count least significant bit minus four element.

In a second aspect of the present disclosure, a method of decoding video data includes: decoding a picture order count most significant bit present flag indicating whether a picture order count most significant bit cycle element is present; and decoding the picture order count most significant bit cycle element specifying a value of a picture order count most significant bit cycle if a value of the picture order count most significant bit present flag is equal to one, wherein a maximum value of the picture order count most significant bit cycle element is set by using a maximum picture order count least significant bit minus four element.

In a third aspect of the present disclosure, a video device to determine picture count information for decoding video pictures includes: at least one processor; and at least one storage device coupled to the at least one processor and storing a plurality of computer-executable instructions which, when executed by the at least one processor, cause the video device to: decode a picture order count (POC) most significant bit (MSB) first flag that indicates whether a POC MSB second flag is present; decode, after determining that the POC MSB second flag is present, the POC MSB second flag that indicates whether a POC MSB cycle element is present; and decode, after determining that the POC MSB cycle element is present, the POC MSB cycle element that specifies a value of a POC MSB cycle, wherein: the value of the POC MSB cycle is used to compute a POC MSB value that is combined with a POC least significant bit (LSB) value to produce a POC value used for decoding a first video picture, and a length of the POC LSB value is based on a maximum POC LSB minus four value.

DESCRIPTION

Figure 1:
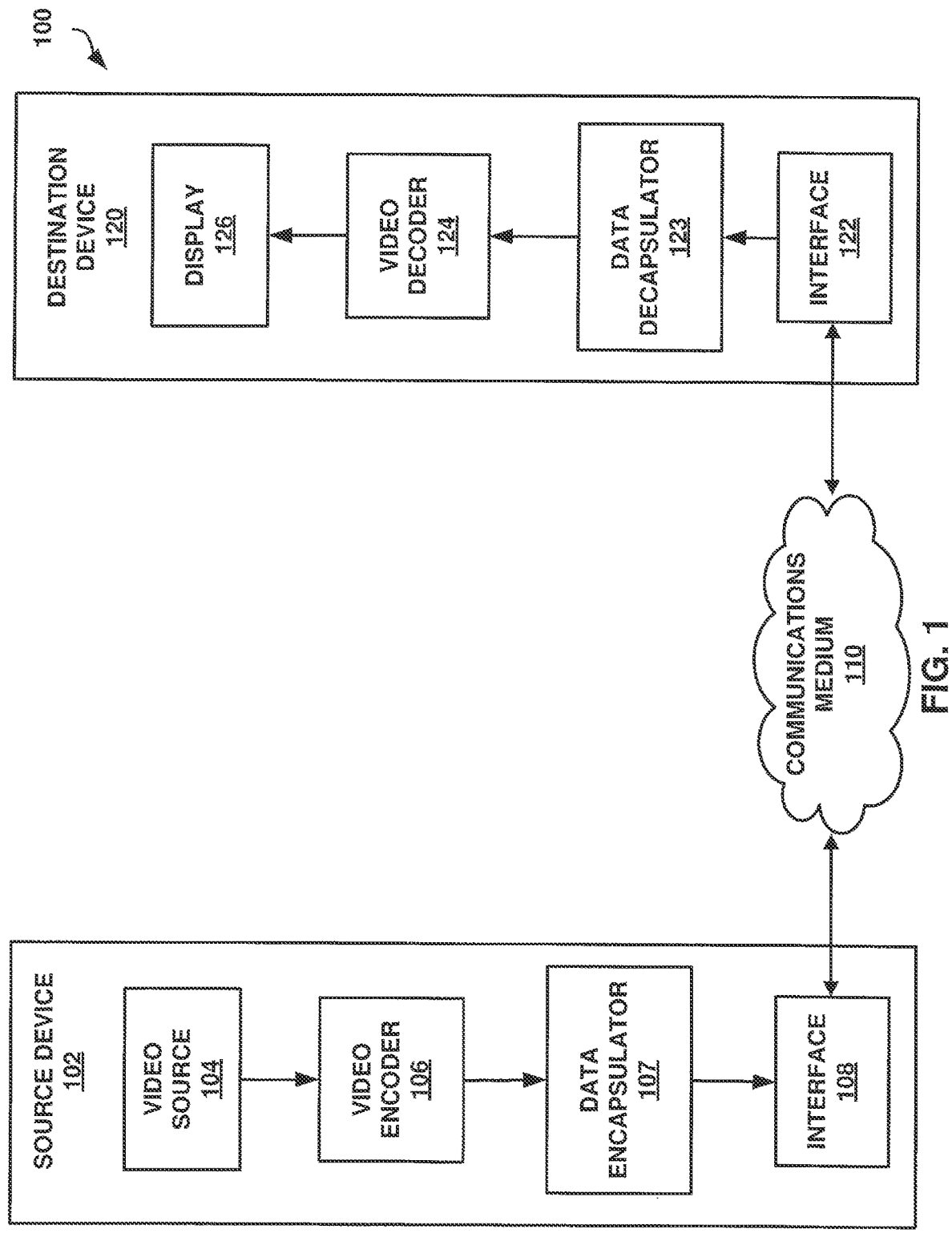
FIG. 1 is a block diagram illustrating an example of a system that may be configured to encode and decode video data, according to an implementation of the present disclosure.

In general, this disclosure describes various techniques for coding video data. In particular, this disclosure describes techniques for signaling of picture types of coded video. Signaling of picture types according to the techniques described herein may be particularly useful for improving video distribution system performance by lowering transmission bandwidth and/or facilitating parallelization of a video encoder and/or decoder. It should be noted that although techniques of this disclosure are described with respect to ITU-T H.264, ITU-T H.265, and JVET-J1001, the techniques of this disclosure are generally applicable to video coding. For example, the coding techniques described herein may be incorporated into video coding systems (including video coding systems based on future video coding standards), including block structures, intra prediction techniques, inter prediction techniques, transform techniques, filtering techniques, and/or entropy coding techniques other than those included in ITU-T H.265. Thus, reference to ITU-T H.264, ITU-T H.265, and JVET-J1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling picture count information includes determining a picture order count most significant bit cycle value, signaling a flag in a parameter set indicating the presence of syntax in a slice header indicating a picture order count most significant bit cycle value, and signaling values for syntax elements in a slice header indicating a picture order count most significant bit cycle value.

In one example, a device includes one or more processors configured to determine a picture order count most significant bit cycle value, signal a flag in a parameter set indicating the presence of syntax in a slice header indicating a picture order count most significant bit cycle value, and signal values for syntax elements in a slice header indicating a picture order count most significant bit cycle value.

In one example, a non-transitory computer-readable storage medium includes instructions stored thereon that, when executed, cause one or more processors of a device to determine a picture order count most significant bit cycle value, signal a flag in a parameter set indicating the presence of syntax in a slice header indicating a picture order count most significant bit cycle value, and signal values for syntax elements in a slice header indicating a picture order count most significant bit cycle value.

In one example, an apparatus includes means for determining a picture order count most significant bit cycle value, means for signaling a flag in a parameter set indicating the presence of syntax in a slice header indicating a picture order count most significant bit cycle value, and means for signaling values for syntax elements in a slice header indicating a picture order count most significant bit cycle value.

In one example, a method of decoding video data includes parsing a flag in a parameter set indicating the presence of syntax in a slice header indicating a picture order count most significant bit cycle value, conditionally parsing values for syntax elements in a slice header indicating a picture order count most significant bit cycle value based on the value of the flag in the parameter set, and determining a picture order count most significant bit cycle value.

In one example, a device includes one or more processors configured to parse a flag in a parameter set indicating the presence of syntax in a slice header indicating a picture order count most significant bit cycle value, conditionally parse values for syntax elements in a slice header indicating a picture order count most significant bit cycle value based on the value of the flag in the parameter set, and determine a picture order count most significant bit cycle value.

In one example, a non-transitory computer-readable storage medium includes instructions stored thereon that, when executed, cause one or more processors of a device to parse a flag in a parameter set indicating the presence of syntax in a slice header indicating a picture order count most significant bit cycle value, conditionally parse values for syntax elements in a slice header indicating a picture order count most significant bit cycle value based on the value of the flag in the parameter set, and determine a picture order count most significant bit cycle value.

In one example, an apparatus includes means for parsing a flag in a parameter set indicating the presence of syntax in a slice header indicating a picture order count most significant bit cycle value, means for conditionally parsing values for syntax elements in a slice header indicating a picture order count most significant bit cycle value based on the value of the flag in the parameter set, and means for determining a picture order count most significant bit cycle value.

The details of one or more examples are set forth in the accompanying drawings and the description below. Other features, objects, and advantages will be apparent from the description and drawings, and from the claims.

Video content typically includes video sequences including a series of frames. A series of frames may also be referred to as a group of pictures (GOP). Each video frame or picture may include a one or more slices, where a slice includes a plurality of video blocks. A video block includes an array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure (which may be referred to as a Largest Coding Unit (LCU)) where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding structures. Further, according to ITU-T H.265, each video frame or picture may be partitioned to include one or more tiles, where a tile is a sequence of coding tree units corresponding to a rectangular area of a picture.

In ITU-T H.265, a CTU is composed of respective CTBs for each component of video data (e.g., luma (Y) and chroma (Cb and Cr)). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (e.g., intra prediction PB sizes type include M×M or M/2×M/2, where M is the height and width of the square CB). In ITU-T H.265, in addition to the square PBs, rectangular PBs are supported for inter prediction, where a CB may by halved vertically or horizontally to form PBs (e.g., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (e.g., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
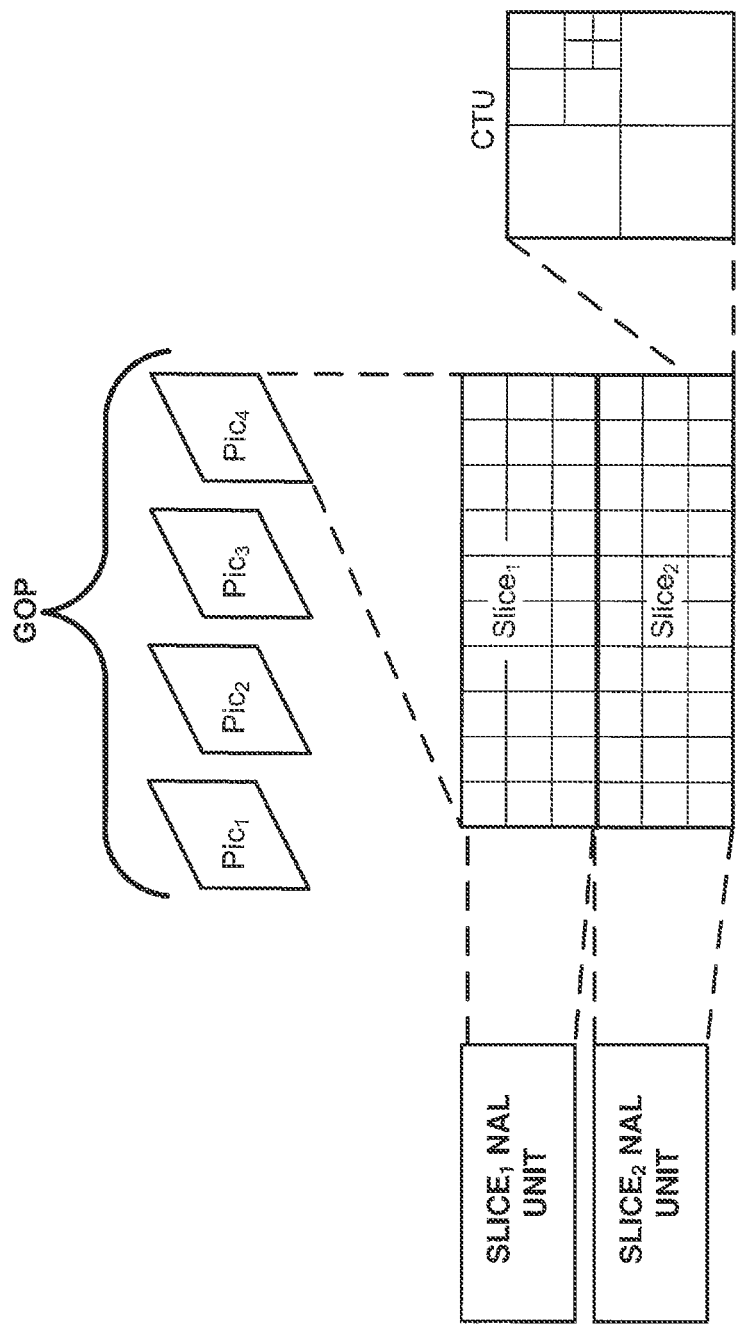
FIG. 2 is a conceptual diagram illustrating an example of a group of pictures including slices, according to an implementation of the present disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. Thus, the binary tree structure in JEM enables square and rectangular leaf nodes, where each leaf node includes a CB. As illustrated in FIG. 2, a picture included in a GOP may include slices, where each slice includes a sequence of CTUs and each CTU may be partitioned according to a QTBT structure. In JEM, CBs are used for prediction without any further partitioning. That is, in JEM, a CB may be a block of sample values on which the same prediction is applied. Thus, a JEM QTBT leaf node may be analogous a PB in ITU-T H.265.

Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (e.g., surface fitting) prediction mode (predMode: 0), a DC (e.g., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP), Spatial-temporal motion vector prediction (STMVP), Pattern matched motion vector derivation (PMMVD) mode, which is a special merge mode based on Frame-Rate Up Conversion (FRUC) techniques, and affine transform motion compensation prediction.

Residual data may include respective arrays of difference values corresponding to each component of video data. Residual data may be in the pixel domain. A transform, such as a discrete cosine transform (DCT), a discrete sine transform (DST), an integer transform, a wavelet transform, or a conceptually similar transform, may be applied to an array of difference values to generate transform coefficients. In ITU-T H.265, a CU is associated with a transform unit (TU) structure having its root at the CU level. That is, in ITU-T H.265, as described above, an array of difference values may be sub-divided for purposes of generating transform coefficients (e.g., four 8×8 transforms may be applied to a 16×16 array of residual values). It should be noted that in ITU-T H.265, TBs are not necessarily aligned with PBs.

It should be noted that in JEM, residual values corresponding to a CB are used to generate transform coefficients without further partitioning. That is, in JEM, a QTBT leaf node may be analogous to both a PB and a TB in ITU-T H.265. It should be noted that, in JEM, a core transform and subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization approximates transform coefficients by amplitudes restricted to a set of specified values. Quantization may be used in order to vary the amount of data required to represent a group of transform coefficients. Quantization may be realized through division of transform coefficients by a scaling factor and any associated rounding functions (e.g., rounding to the nearest integer). Quantized transform coefficients may be referred to as coefficient level values. Inverse quantization (or "dequantization") may include multiplication of coefficient level values by the scaling factor. It should be noted that, as used herein, the term quantization process in some instances may refer to division by a scaling factor to generate level values or multiplication by a scaling factor to recover transform coefficients in some instances. That is, a quantization process may refer to quantization in some cases and inverse quantization in some cases.

With respect to the equations used herein, the following arithmetic operators may be used:

+ Addition
− Subtraction
Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
∴ Used to denote division in mathematical equations where no truncation or rounding is intended.

$$\frac{x}{y}$$

Used to denote division in mathematical equations where no truncation or rounding is intended.

Further, the following mathematical functions may be used:

Log 2(x) the base-2 logarithm of x;

$$\text{Min}(x, y) = \begin{cases} x; x <= y \\ y; x > y \end{cases};$$

$$\text{Max}(x, y) = \begin{cases} x; x >= y \\ y; x < y \end{cases}$$

Ceil(x) the smallest integer greater than or equal to x.

With respect to the example syntax used herein, the following definitions of logical operators may be applied:

x && y Boolean logical "and" of x and y
x||y Boolean logical "or" of x and y
Boolean logical "not"
x?y:z If x is TRUE or not equal to 0, evaluates to the value of y; otherwise, evaluates to the value of z.

Further, the following relational operators may be applied:

< Greater than
<= Greater than or equal to
> Less than
>= Less than or equal to
== Equal to
!= Not equal to Further, it should be noted that in the syntax descriptors used herein, the following descriptors may be applied:

f(n): fixed-pattern bit string using n bits written (from left to right) with the left bit first. The parsing process for this descriptor is specified by the return value of the function react_bits(n).

u(n): unsigned integer using n bits. When n is "v" in a syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

i(n): signed integer using n bits. When n "v" in a syntax table, the number of bits varies in a manner dependent on the value of other syntax elements. The parsing process for this descriptor is specified by the return value of the function read_bits(n) interpreted as a two's complement integer representation with most significant bit written first.

As described above, according to ITU-T H.265, each video frame or picture may be partitioned to include one or more slices and further partitioned to include one or more tiles. FIG. 2 is a conceptual diagram illustrating an example of a group of pictures including slices, according to an implementation of the present disclosure. In the example illustrated in FIG. 2, Pic 4 is illustrated as including two slices (e.g., $Slice_1$ and $Slice_2$) where each slice includes a sequence of CTUs (e.g., in raster scan order). It should be noted that a slice is a sequence of one or more slice segments starting with an independent slice segment and containing all subsequent dependent slice segments (if any) that precede the next independent slice segment (if any) within the same access unit. A slice segment, like a slice, is a sequence of coding tree units. In the examples described herein, in some cases the terms slice and slice segment may be used interchangeably to indicate a sequence of coding tree units. It should be noted that in ITU-T H.265, a tile may include coding tree units contained in more than one slice and a slice may include coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Tile sets may be used to define boundaries for coding dependencies (e.g., intra-prediction dependencies, entropy encoding dependencies, etc.,) and as such, may enable parallelism in coding.

In ITU-T H.265, a coded video sequence (CVS) may be encapsulated (or structured) as a sequence of access units, where each access unit includes video data structured as network abstraction layer (NAL) units. In ITU-T H.265, a bitstream is described as including a sequence of NAL units forming one or more CVSs. It should be noted that ITU-T H.265 supports multi-layer extensions, including format range extensions (RExt), scalability (SHVC), multi-view (MV-HEVC), and 3-D (3D-HEVC). Multi-layer extensions enable a video presentation to include a base layer and one or more additional enhancement layers. For example, a base layer may enable a video presentation having a basic level of quality (e.g., High Definition rendering) to be presented and an enhancement layer may enable a video presentation having an enhanced level of quality (e.g., an Ultra High Definition rendering) to be presented. In ITU-T H.265, an enhancement layer may be coded by referencing a base layer. That is, for example, a picture in an enhancement layer may be coded (e.g., using inter prediction techniques) by referencing one or more pictures (including scaled versions thereof) in a base layer. In ITU-T H.265, each NAL unit may include an identifier indicating a layer of video data the NAL unit is associated with. It should be noted that sub-bitstream extraction may refer to a process where a device receiving a compliant bitstream forms a new compliant bitstream by discarding and/or modifying data in the received bitstream. For example, sub-bitstream extraction may be used to form a new compliant bitstream corresponding to a particular representation of video (e.g., a high-quality representation).

Referring to the example illustrated in FIG. 2, each slice of video data included in Pico (e.g., $Slice_1$ and $Slice_2$) is illustrated as being encapsulated in a NAL unit. In ITU-T H.265, each of a video sequence, a GOP, a picture, a slice, and CTU may be associated with metadata that describes video coding properties. ITU-T H.265 defines parameters sets that may be used to describe video data and/or video coding properties. In ITU-T H.265, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, ITU-T H.265 enables supplemental enhancement information (SEI) messages to be signaled. In ITU-T H.265, SEI messages assist in processes related to decoding, display or other purposes, however, SEI messages may not be required for constructing the luma or chroma samples by the decoding process. In ITU-T H.265, SEI messages may be signaled in a bitstream using non-VCL NAL units. Further, SEI messages may be conveyed by some means other than by being present in the bitstream (e.g., signaled out-of-band).

Figure 3:
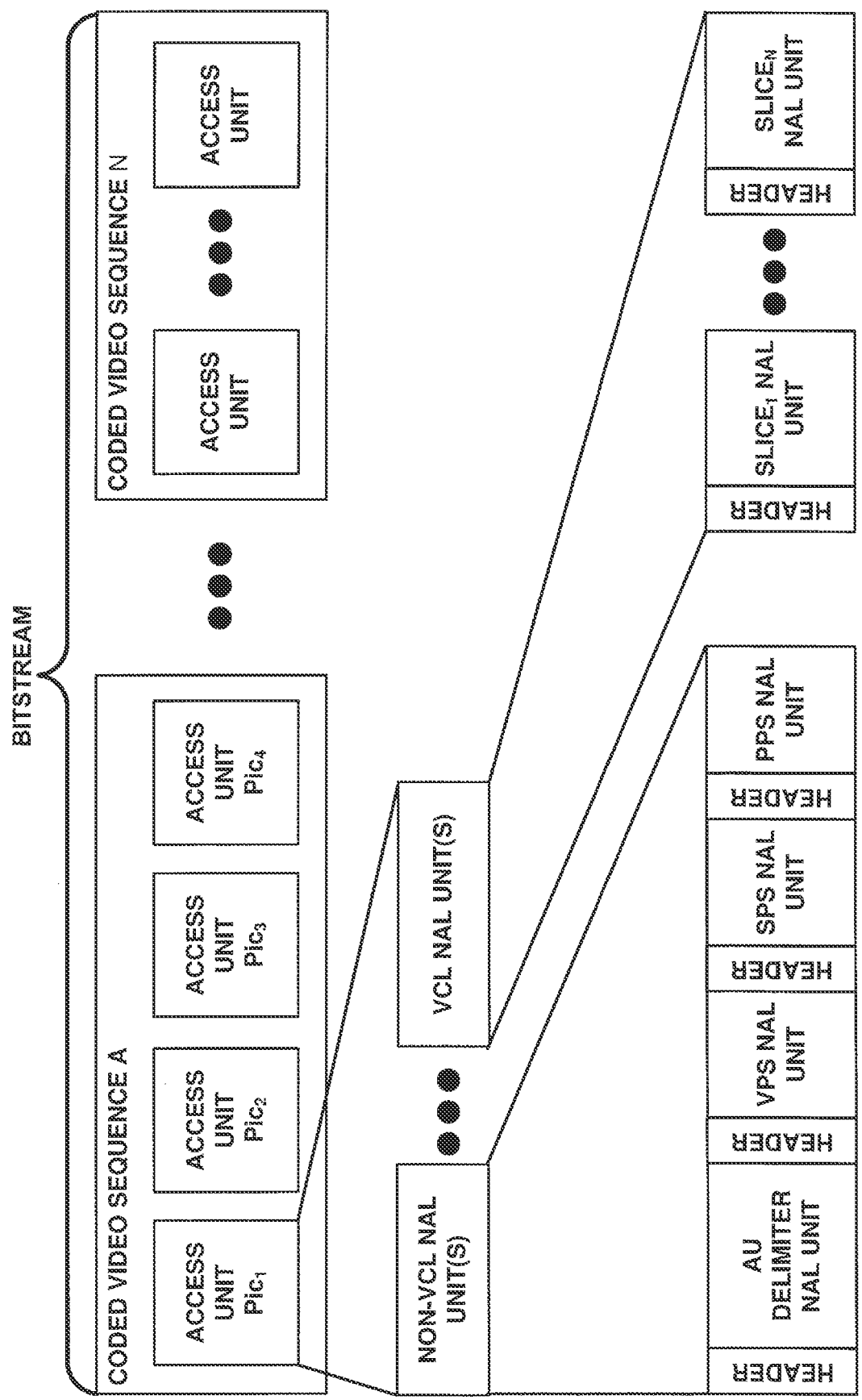
FIG. 3 is a conceptual diagram illustrating a data structure encapsulating coded video data and corresponding metadata, according to an implementation of the present disclosure.

FIG. 3 illustrates an example of a bitstream including multiple CVSs, where a CVS is represented by NAL units included in a respective access unit. In the example illustrated in FIG. 3, non-VCL NAL units include respective parameter set units (e.g., Video Parameter Sets (VPS), Sequence Parameter Sets (SPS), and Picture Parameter Set (PPS) units) and an access unit delimiter NAL unit. ITU-T H.265 defines NAL unit header semantics that specify the type of Raw Byte Sequence Payload (RBSP) data structure included in the NAL unit. It should be noted that ITU-T H.265 provides various picture types which are defined based on decoding order and/or output order. In ITU-T H.265, an intra random access point (IRAP) picture is a picture that does not refer to any pictures other than itself for inter prediction in its decoding process and the first picture in the bitstream in decoding order must be an IRAP picture. It should be noted in ITU-T H.265 that there may be pictures in a bitstream that do not refer to any pictures other than itself for inter prediction in its decoding process that are not IRAP pictures. An example of an IRAP pictures includes an instantaneous decoding refresh (IDR) picture which is a picture that does not refer to any pictures other than itself for inter prediction in its decoding process, and may be the first picture in the bitstream in decoding order, or may appear later in the bitstream. ITU-T H.265 provides where a leading picture is a picture that precedes the associated IRAP picture in output order and a trailing picture is a non-IRAP picture that follows the associated IRAP picture in output order. It should be noted that trailing pictures associated with an IRAP picture also follow the IRAP picture in decoding order and pictures that follow the associated IRAP picture in output order and precede the associated IRAP picture in decoding order are not allowed.

ITU-T H.265 provides where each coded picture is associated with a picture order count variable, denoted as PicOrderCntVal. In ITU-T H.265, picture order counts are used to identify pictures, for deriving motion parameters in merge mode and motion vector prediction, and for decoder conformance checking. In ITU-T H.265, in one CVS, the PicOrderCntVal values for all coded pictures is unique. Further, in ITU-T H.265 picture order counts provide the relative output order of pictures (e.g., from a decoded picture buffer, e.g., for display) included in a CVS (e.g., pictures with lower picture order counts are output before pictures with a higher picture order counts). In ITU-T H.265, the value of PicOrderCntVal is in the range of $-2^{31}$ to $2^{31}-1$, inclusive. In ITU-T H.265, the sequence parameter set syntax includes syntax element log 2_max_pic_order_cnt_lsb_minus4 which specifies the value of a variable MaxPicOrderCntLsb that is used in the decoding process for picture order count as follows:

MaXPicOrderentLSB=
$2^{(log\ 2\_max\_pic\_order\_cnt\_lsb\_minus4+4)}$

Where the value of log 2_max_pic_order_cnt_lsb_minus4 shall be in the range of 0 to 12, inclusive.

ITU-T H.265 provides where a PicOrderCntVal is equal to PicOrderCntMsb+slice_pic_order_cnt_lsb. slice_pic_order_cnt_lsb is derived as follows:

When the current picture is not an IRAP picture and output, the variable prevPicOrderCntLsb is derived as follows:

Let prevTid0Pic be the previous picture in decoding order that has: TemporalId equal to 0 and that is not a random access skipped leading (RASL), a random access decodable leading (RADL), or a sub-layer non-reference. (SLNR) picture.

The variable prevPicOrderCntLsb is set equal to the slice_pic_prder_cnt_lsb of prevTid0Pic.

Where the syntax element slice_pic_order_cnt_lsb is conditionally included in the slice_segment_header( ) syntax when a picture is not an IRAP picture and the has the following definition:

slice_pic_order_cnt_lsb specifies the picture order count modulo MaxPicOrderCntLsb for the current picture. The length of the slice, pic_order_cnt_lsb syntax element is log 2_max_pic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0 (for cases other than a generated picture).

In ITU-T H.265, PicOrderCntMsb is derived as follows:
When the current picture is not an IRAP picture and output, the variable prevPicOrderCntLsb is derived as follows:

The variable prevPicOrderCntMsb is set equal to PicOrderCntMsb of prevTid0Pic.

If the current picture is an IRAP picture with NoRaslOutputFlag equal to 1, PicOrderCntMsb is set equal to 0.

Otherwise, PicOrderCntMsb is derived as follows:

```
if( ( slice_pic_order_cnt_lsb < prevPicOrderCntLsb ) &&
    ( ( prevPicOrderCntLsb - slice_pic_order_cnt_lsb ) >=
( MaxPicOrderCntLsb / 2 ) ) )
    PicOrderCntMsb = prevPicOrderCntMsb + MaxPicOrderCntLsb
else if( (slice_pic_order_cnt_lsb > prevPicOrderCntLsb ) &&
    ( ( slice_pic_order_cnt_lsb - prevPicOrderCntLsb ) >
( MaxPicOrderCntLsb / 2 ) ) )
    PicOrderCntMsb = prevPicOrderCntMsb - MaxPicOrderCntLsb
else
PicOrderCntMsb = prevPicOrderCntMsb
```

It should be noted that in ITU-T H.265, all IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

It should be noted that WET-J1001 provides the slice head syntax illustrated in Table 1.

TABLE 1

|  | Descriptor |
|---|---|
| slice_header( ) { | |
|   slice_pic_parameter_set_id | ue(v) |
|   slice_address | u(v) |
|   slice_type | ue(v) |
|   if ( slice_type != I ) | |
|     log2_diff_ctu_max_bt_size | ue(v) |
|   byte_alignment( ) | |
| } | |

JVET-J1001 provides the following definitions for the respective syntax elements illustrated in Table 1.

slice_pic_parameter_set_id specifies the value of pps_pic_parameter_set_id for the PPS in use. The value of slice_pic_parameter_set_id shall be in the range of 0 to 68, inclusive.

slice_address specifies the address of the first CTB in the slice, in CTB raster scan of a picture. The length of the slice_address syntax element is Ceil(Log 2(PicSizeInCtbsY)) bits. The value of slice_address shall be in the range of 0 to PicSizeInCtbsY−1, inclusive, and the value of slice_address shall not be equal to the value of slice_address of any other coded slice NAL unit of the same coded picture.

The variable CtbAddrInRs, specifying a CTB address in CTB raster scan of a picture, is set equal to slice_address.

slice_type specifies the coding type of the slice according to Table 2.

TABLE 2

| slice_type | Name of slice_type |
|---|---|
| 0 | B (B slice) |
| 1 | P (P slice) |
| 2 | I (I slice) |

When nal_unit_type has a value in the range of [to be determined], inclusive, i.e., the picture is an IRAP picture, slice_type shall be equal to 2.

log 2_diff_ctu_max_bt_size specifies the difference between the luma CTB size and the maximum luma size (width or height) of a coding block that can be split using a binary split. The value of log 2_diff_ctu_max_bt_size shall be in the range of 0 to Ctb Log 2SizeY−MinCb Log 2SizeY, inclusive.

It should be noted that a B slice refers to a slice where bi-prediction inter prediction, uni-prediction inter prediction, and intra prediction are allowed; a P slice refers to a slice where uni-prediction inter prediction, and intra prediction are allowed; and a I slice refers where only intra prediction is allowed. It should be noted that in some cases B and P slices are collectively referred to as inter slices.

This disclosure describes techniques for signaling picture order count values which are simplified and provide more flexibility compared to those described in ITU-T H.265. According to the techniques described herein, a video encoder may signal picture order count values and the like using the syntax and semantics described herein. A video decoder may determine picture order count values and the like by parsing signaling that uses the syntax and semantics described herein and perform video decoding and output pictures based on the determined picture order count values.

FIG. 1 is a block diagram illustrating an example of a system that may be configured to code (e.g., encode and/or decode) video data, according to an implementation of the present disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, and personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid-state drives. Data may be stored on a storage device according to a defined file format.

Figure 4:
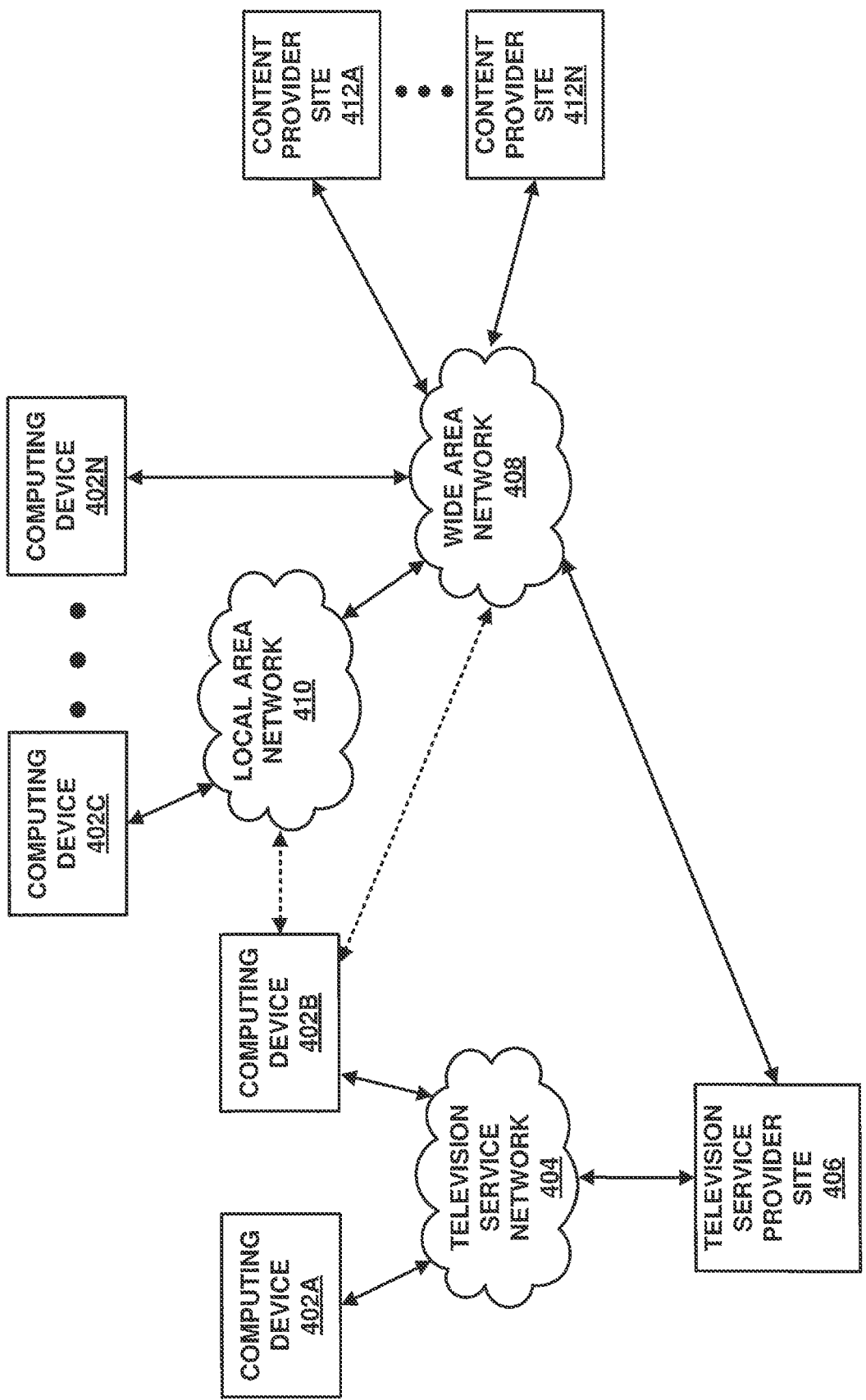
FIG. 4 is a conceptual drawing illustrating an example of components that may be included in an implementation of a system that may be configured to encode and decode video data, according to an implementation of the present disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that, although, in some examples, television service network 404 may primarily be used to enable television services to be provided, television service network 404 may also enable other types of data and services to be provided according to any combination of the telecommunication protocols described herein. Further, it should be noted that, in some examples, television service network 404 may enable two-way communications between television service provider site 406 and one or more computing devices 402A-402N. Television service network 404 may include any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that, in some examples, television service provider site 406 may include a television studio and content may originate therefrom.

Wide area network 408 may include a packet-based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may include any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet-based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext-based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom.

Figure 5:
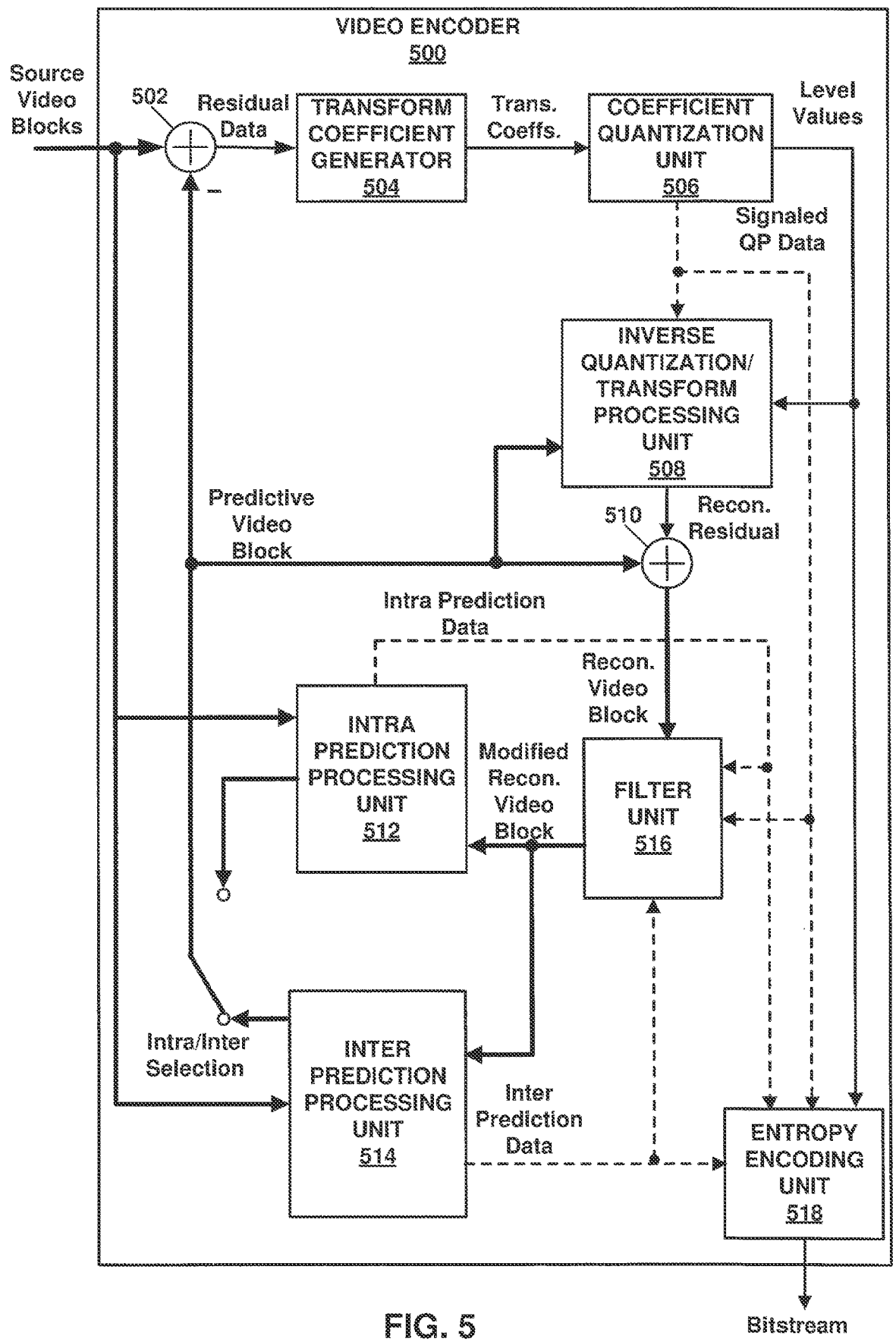
FIG. 5 is a block diagram illustrating an example of a video encoder that may be configured to encode video data, according to an implementation of the present disclosure.

Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that, although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that have been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (e.g., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (e.g., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclose.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving an ITU-T H.265 compliant bitstream forms a new ITU-T H.265 compliant bitstream by discarding and/or modifying data in the received bitstream. It should be noted that the term conforming bitstream may be used in place of the term compliant bitstream.

As described above, ITU-T H.265 provides where the sequence parameter set syntax includes syntax element log 2_max_pic_order_cnt_lsb_minus4 which specifies the value of a variable MaxPicOrderCntLsb. According to the techniques herein, the sequence parameter set syntax may additionally include syntax element log 2_max_pic_order_cnt_msb_cycle_minus1 (e.g., immediately preceding or following log 2_max_pic_order_cnt_lsb_minus4 or in some other location in the sequence parameter set or another parameter set). In one example, log 2_max_pic_order_cnt_msb_cycle_minus1 may be based on the following definition:

log 2_max_pic_order_cnt_msb_cycle_minus1 specifies the value of the variable MaxPicOrderCntMSBCycle that is used in the decoding process for picture order count as follows:

MaxPicOrderCntMSBCycle= $2^{(log\ 2\_max\_pic\_order\_cnt\_msb\_minus1+1)}$

The value of log 2_max_pic_order_cnt_msb_cycle_minus1 shall be in the range of 0 to 15, inclusive.

It should be noted that, in some examples, the value of log 2_max_pic_order_cnt_msb_cycle_minus1 may be within other ranges (e.g., 0 to 16, inclusive, 0 to 28, inclusive, 0 to 48, inclusive, etc.).

In one example, a slice header may include slice_poc_info( ) syntax. For example, Table 3 illustrates an example of a slice header including slice_poc_info( ) syntax. The syntax elements included in slice_header( ) may be based on the definitions provided above.

TABLE 3

| | Descriptor |
|---|---|
| slice_header( ) { | |
|   slice_pic_parameter_set_id | ue(v) |
|   slice_address | u(v) |
|   slice_type | ue(v) |
|   if ( slice_type != I ) | |
|     log2_diff_ctu_max_bt_size | ue(v) |
|   slice_poc_info( ) | |
|   byte_alignment( ) | |
| } | |

Table 4 provides an example of syntax for slice_poc_info( ).

TABLE 4

| | Descriptor |
|---|---|
| slice_poc_info( ) { | |
|   slice_pic_order_cnt_lsb | u(v) |
|   slice_pic_order_cnt_msb_cycle_present | u(1) |
|   if(slice_pic_order_cnt_msb_cycle_present) { | |
|     slice_pic_order_cnt_msb_cycle | u(v) |
|   } | |
| } | |

Syntax elements slice_pic_order_cnt_lsb, slice_pic_order_cnt_msb_cycle_present, and slice_pic_order_cnt_msb_cycle in Table 4 may be based on the following example definitions:
  slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4 bits. The value of the slice_pic_order_cnt_lsb shall be in the range of 0 to MaxPicOrderCntLsb−1, inclusive.
  slice_pic_order_cnt_msb_cycle_present equal to 1 indicates that slice_pic_order_cnt_msb_cycle syntax element follows next. slice_pic_order_cnt_msb_cycle_present equal to 0 indicates that slice_pic_order_cnt_msb_cycle syntax element is not signaled. When not signaled slice_pic_order_cnt_msb_cycle_present is inferred to be equal to 0. When current picture is an IDR picture the slice_pic_order_cnt_msb_cycle_present shall be equal to 0.
  slice_pic_order_cnt_msb_cycle specifies the picture order count MSB cycle value. The length of the slice_pic_order_cnt_msb_cycle syntax element is log 2_max_pic_order_cnt_msb_cycle_minus1+1 bits. The value of the slice_pic_order_cnt_msb_cycle shall be in the range of 0 to MaxPicOrderCntMSBCycle−1, inclusive.

It should be noted that, in some examples, slice_pic_order_cnt_msb_cycle may be coded as i(v) to allow signaling of negative values for slice_pic_order_cnt_msb_cycle.

It should be noted that, in some examples, minus one signaling may not be used for log 2_max_pic_order_cnt_msb_cycle_minus1. That is, log 2_max_pic_order_cnt_msb_cycle_minus1 may be replaced with syntax element log 2_max_pic_order_cnt_msb_cycle, which may be based on the following definition:
  log 2_max_pic_order_cnt_msb_cycle specifies the value of the variable MaxPicOrderCntMSBCycle that is used in the decoding process for picture order count as follows;

$$\text{Max PicOrderCntMSBCycle} = 2^{(\log 2\_max\_pic\_order\_cnt\_msb\_cycle)}$$

The value of log 2_max_pic_order_cnt_msb_cycle shall be in the range of 0 to 16 (or 0 to 15, inclusive, 0 to 28, inclusive, 0 to 48, inclusive, ecce, inclusive.

When log 2_max_pic_order_cnt_msb_cycle is used, the definition of slice_pic_order_cnt_msb_cycle may be modified as follows:
  slice_pic_order_cnt_msb_cycle specifies the picture order count MSB cycle value. The length of the slice_pic_order_cnt_msb_cycle syntax element is log 2max_pic_order_cnt_msb_cycle bits. The value of the slice_pic_order_cnt_msb_cycle shall be in the range of 0 to MaxPicOrderCntMSBCycle−1, inclusive.

It should be noted that, in some examples, log 2 max_pic_order_cnt_msb_cycle_minus1 may not be used and in such cases slice_pic_order_cnt_msb_cycle may be signaled using a ue(v) data type instead of a u(v) data type.

In one example, instead of signaling log 2_max_pic_order_cnt_msb_cycle_minus1, the value of MaxPicOrderCntMSBCycle may be derived from the value of log 2_max_pic_order_cnt_lsb_minus4 and MaxPicOrderCnt, which is pre-defined. In one example, MaxPicOrderCntMSBCycle may be derived as follows:

$$\text{PicOrderCntBitDepth} = \text{Ceil}(\text{Log 2}(\text{Max PicOrderCnt})$$

$$\text{Log 2 Max PicOrderCntMSBCycle} = \text{PicOrderCntBitDepth} - (\log 2\_max\_pic\_order\_cnt\_lsb\_minus4+4)$$

$$\text{Max PicOrderCntMSBCycle} = 2^{Log\ 2\ Max\ PicOrderCntMSBCycle}$$

In one example, instead of signaling log 2_max_pic_order_cnt_lsb_minus4, the value of MaxPicOrderCntLsb may be derived from the value of log 2_max_pic_order_cnt_msb_cycle_minus1 and MaxPicOrderCnt, which is pre-defined. In one example, MaxPicOrderCntLsb may be derived as follows:

$$\text{PicOrderCntBitDepth} = \text{Ceil}(\text{Log 2}(\text{Max PicOrderCnt}))$$

$$\text{Log 2 Max PicOrderCntLSB} = \text{PicOrderCntBitDepth} - (\log 2\_max\_pic\_order\_cnt\_msb\_cycle\_minus1+1)$$

$$\text{Max PicOrderCntLsb} = 2^{\log\ 2\ Max\ PicOrderCntLsb}$$

According to the syntax elements provided in slice_poc_info( ) a PicOrderCntVal being equal to PicOrderCntMsb+slice_pic_order_cnt_lsb may be derived as follows:
  When the current picture is not an IDR picture or the current picture does not have slice_pic_order_cnt_msb_ cycle signaled, the variables prevPicOrderCntLsb and prevPicOrderCntMsb are derived as follows:
  Let prevTid0Pic be the previous picture in decoding order that has TemporalId equal to 0 and a sub-layer non-reference picture.
  The variable prevPicOrderCntLsb is set equal to slice_pic_order_cnt_lsb of prevTid0Pic.
  The variable prevPicOrderCntMsb is set equal to PicOrderCntMsb of prevTid0Pic.
The variable PicOrderCntMsb of the current picture is derived as follows:
  If the current picture is an IDR picture or if log 2_max_pic_order_cnt_msb_cycle for the active SPS for this slice is present and is equal to 0 the variable PicOrderCntMsb is set equal to 0.
  Otherwise if the slice of the current picture has slice_pic_order_cnt_msb_cycle signaled, the variable PicOrderCntMSB is set equal to slice_pic_order_cnt_msb_cycle multiplied by MaxPicOrderCntLsb. Otherwise, PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >=
  ( MaxPicOrderCntLsb / 2 ) ) )
      PicOrderCntMsb = prevPicOrderCntMsb + MaxPicOrderCntLsb
else if( (slice_pic_order_cnt_lsb > prevPicOrderCntLsb ) &&
    ( ( slice_pic_order_cnt_lsb − prevPicOrderCntLsb ) >
  ( MaxPicOrderCntLsb / 2 ) ) )
      PicOrderCntMsb = prevPicOrderCntMsb − MaxPicOrderCntLsb
else
PicOrderCntMsb = prevPicOrderCntMsb
```

PicOrderCntVal is derived as follows:

PicOrderCntVal=PicOrderCntMsb+slice_pic_order_cnt_lsb

It should be noted that in some examples, the value of PicOrderCntVal shall be in the range of $-2^{31}$ to $2^{31}-1$, inclusive.

In another example, a PicOrderCntVal being equal to currentPicOrderCntMsb+slice_pic_order_cnt_lsb may be derived as follows:

If the current picture is an IDR picture the variable currentPicOrderCntMsb is set equal to 0.

Otherwise if the slice of the current picture has slice_pic_order_cnt_msb_cycle signaled, the variable currentPicOrderCntMsb is set equal to slice_pic_order_cnt_msb_cycle multiplied by MaxPicOrderCntLsb.

Otherwise, the variable currentPicOrderCntMSB is derived as follows:

Let prevPOCMSBPic be the previous picture in decoding order that has slice_pic_order_cnt_msb_cycle signaled or is an IDR picture, whichever is closer in decoding order to the current picture.

Then the variable currentPicOrderCntMsb is set equal to 0 if prevPOCMSBPic is an IDR picture or is set equal to slice_pic_order_cnt_msb_cycle of the prevPOCMSBPic picture multiplied by MaxPicOrderCntLsb if prevPOCMSBPic is not an IDR picture.

PicOrderCntVal is derived as follows:

PicOrderCntVal=PicOrderCntMsb+slice_pic_order_cnt_lsb

In one example, a flag to control signaling of slice level MSB picture order count related syntax elements may be signaled in a parameter set, e.g., a VPS, an SPS, or a PPS. Table 5 illustrates an example of a sequence parameter set including slice_pic_order_cnt_msb_signaling_present.

TABLE 5

| | Descriptor |
|---|---|
| seq_parameter_set_rbsp( ) { | |
| ... | |
| log2_max_pic_order_cnt_lsb_minus4 | ue(v) |
| slice_pic_order_cnt_msb_signaling_present | u(1) |
| if(slice_pic_order_cnt_msb_signaling_present) | |
| log2_max_pic_order_cnt_msb_cycle | ue(v) |
| rbsp_trailing_bits( ) | |
| } | |

With respect to Table 5, the semantics of various syntax elements may be as follows:

log 2_max_pic_order_cnt_lsb_minus4 specifies the value of the variable MaxPicOrderCntLsb that is used in the decoding process for picture order count as follows:

$$Max\ PicOrderCntLsb* 2^{(log\ 2\_max\_pic\_order\_cnt\_lsb\_minus4+4)}$$

The value of log 2_max_pic_order_cnt_lsb_minus4 shall be in the range of 0 to 12, inclusive.

In another example, the value of log 2_max_pic_order_cnt_lsb_minus4 shall be in the range of 0 to 16, inclusive. In general, some other valid value range may be declared for log 2_max_pic_order_cnt_lsb_minus4.

slice_pic_order_cut_msb_signaling_present equal to 0 indicates that POC MSB related information for picture order count is not signaled in the slice header, slice_pic_order_cut_msb_signaling_present equal to 1 indicates that POC MSB related information may be signaled in the slice header.

log 2_max_pic_order_cnt_msb_cycle specifies the value of the variable MaxPicOrderCntMSBCycle as follows:

$$Max\ PicOrderCntMSBCycle= 2^{(log\ 2\_max\_pic\_order\_cnt\_msb\_cycle)}$$

The value of log 2_max_pic_order_cnt_msb_cycle shall be in the range of 0 to 28, inclusive.

In another example, the value of log 2_max_pic_order_cnt_msb_cycle shall be in the range of 0 to 16, inclusive. In general, some other valid value range may be declared for log 2_max_pic_order_cnt_msb_cycle.

When syntax element slice_pic_order_cnt_msb_signaling_present is included in a parameter set, slice_poc_info( ) may be as illustrated in Table 6.

TABLE 6

| | Descriptor |
|---|---|
| slice_poc_info( ) { | |
| slice_pic_order_cnt_lsb | u(v) |
| if(slice_pic_order_cnt_msb_signaling_present) { | |
| slice_pic_order_cnt_msb_cycle_present | u(1) |
| if(slice_pic_order_cnt_msb_cycle_present) { | |
| slice_pic_order_cnt_msb_cycle | u(v) or ue(v) |
| } | |
| } | |
| } | |

With respect to Table 6, the semantics of various syntax elements may be as follows:

slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4 bits. The value of the slice_pic_order_cnt_lsb shall be in the range of 0 to MaxPicOrderCntLsb−1, inclusive.

In the case of the example illustrated with respect to Table 5 and Table 6, slice_pic_order_cnt_msb_cycle_present and slice_pic_order_cnt_msb_cycle may be based on the following definition:

slice_pic_order_cnt_msb_cycle_present equal to 1 indicates that slice_pic_order_cnt_msb_cycle syntax element follows next. slice_pic_order_cnt_msb_cycle_present equal to 0 indicates that slice_pic_order_cnt_msb_cycle syntax element is not signaled. When not signaled slice_pic_order_cnt_msb_cycle_present is inferred to be equal to 0. When current picture is an IDR picture the slice_pic_order_cnt_msb_cycle_present shall be equal to 0. When log 2_max_pic_order_cnt_msb_cycle is equal to 0, slice_pic_order_cnt_msb_cycle_present shall be equal to 0.

slice_pic_order_cnt_msb_cycle specifies the picture order count MSB cycle value. The length of the slice_pic_order_cnt_msb_cycle syntax element is log 2_max_pic_order_cnt_msb_cycle bits. The value of the slice_pic_order_cnt_msb_cycle shall be in the range of 0 to MaxPicOrderCntMSBCycle−1, inclusive.

In one example, slice_pic_order_cnt_msb_cycle_present may be included in a parameter set. When syntax element slice_pic_order_cnt_msb_cycle_present is included in a parameter set, slice_poc_info( ) may be modified as illustrated in Table 7.

TABLE 7

|  | Descriptor |
| --- | --- |
| slice_poc_info( ) { | |
|   slice_pic_order_cnt_lsb | u(v) |
|   if(slice_pic_order_cnt_msb_cycle_present) { | |
|     slice_pic_order_cnt_msb_cycle | u(v) or ue(v) |
|   } | |
| } | |

In some examples, the presence of syntax elements in slice_poc_info( ) may be based on values of log 2_max_pic_order_cnt_msb_cycle_minus1 or log 2_max_pic_order_cnt_msb_cycle. For example, Table 8 illustrates an example where the presence of slice_pic_order_cnt_msb_cycle_present and slice_pic_order_cnt_msb_cycle are conditioned on log 2_max_pic_order_cnt_msb_cycle not being equal to zero. In one example, if log 2_max_pic_order_cnt_msb_cycle is equal to zero, slice_pic_order_cnt_msb_cycle_present shall be constrained to be equal to zero.

TABLE 8

|  | Descriptor |
| --- | --- |
| slice_poc_info( ) { | |
|   slice_pic_order_cnt_lsb | u(v) |
|   if(slice_pic_order_cnt_msb_signaling_present && log2_max_pic_order_cnt_msb_cycle!=0) { | |
|     slice_pic_order_cnt_msb_cycle_present | u(1) |
|     if(slice_pic_order_cnt_msb_cycle_present) { | |
|       slice_pic_order_cnt_msb_cycle | ue(v) |
|     } | |
|   } | |
| } | |

In one example, instead of signaling slice_pic_order_cnt_msb_cycle, a syntax element slice_pic_order_msb value may be signaled. The syntax element slice_pic_order_msb may be coded as ue(v) or as u(v). In this case, instead of log 2_max_pic_order_cnt_msb_cycle_minus1, a syntax element log 2_max_pic_order_cnt_msb_minus1 may be signaled with semantics as follows:

log 2_max_pic_order_cnt_msb_minus1 specifies the value of die variable MaxPicOrderCntMSB that is used in the decoding process for picture order count as follows:

Max PicOrderCntMSB= $2^{(\log 2\_max\_pic\_order\_cnt\_msb\_minus1+1)}$

In some examples, constraint may be put on MaxPicOrderCntMSB. Further, in this case, the decoding process for picture order count may be modified such that the variable PicOrderCntMSB is set equal to slice_pic_order_msb.

In one example, slice_pic_order_cnt_msb_cycle may be always signaled when slice_pic_order_cnt_lsb is equal to zero. In one example, this may be further controlled by an additional slice and/or parameter set level flag(s). In other cases, a constraint may be imposed for whether slice_pic_order_cnt_msb_cycle is signaled and possible values thereof. In another example, slice_pic_order_cnt_msb_cycle may be always signaled for a TId 0 picture. In one example, constraints may be placed on various syntax elements and/or across slices and/or parameters sets.

In one example, a sequence parameter set may include a flag to indicate whether a syntax element slice_pic_order_cnt is present in a slice header. slice_pic_order_cnt may specify the value of picture order count value without separating bits to MSB and LSB and may be based on the following definition.

slice_pic_order_cnt specifies the picture order count value for the current picture. The value of the slice_pic_order_cnt shall be in the range of 0 to MaxPicOrderCnt, inclusive.

Table 9 and Table 10 illustrate an example where a flag, full_pic_order_cnt_signal_flag, indicates whether log 2_max_pic_order_cnt_lsb_minus4 and log 2_max_pic_order_cnt_msb_cycle_minus1 are present in a sequence parameter set and whether a syntax element slice_pic_order_cnt is present in a slice header.

TABLE 9

|  | Descriptor |
| --- | --- |
| seq_parameter_set_rbsp( ) { | |
|   ... | |
|   full_pic_order_cnt_signal_flag | u(1) |
|   if( ! full_pic_order_cnt_signal_flag) { | |
|     log2_max_pic_order_cnt_lsb_minus4 | ue(v) |
|     log2_max_pic_order_cnt_msb_cycle_minus1 | ue(v) |
|   } | |
|   rbsp_trailing_bits( ) | |
| } | |

TABLE 10

|  | Descriptor |
| --- | --- |
| slice_poc_info( ) { | |
|   if( full_pic_order_cnt_signal_flag) { | |
|     slice_pic_order_cnt | |
|   } | |
|   else { | |
|     slice_pic_order_cnt_lsb | u(v) |
|     if(slice_pic_order_cnt_msb_cycle_present) { | |
|       slice_pic_order_cnt_msb_cycle | ue(v) |
|     } | |
|   } | |
| } | |

Table 10

In the case of the example illustrated with respect to Table 9 and Table 10, PicOrderCntVal may be derived as follows:

```
if (full_pic_order_cnt_signal_flag)
    PicOrderCntVal = slice_pic_order_cnt
else
    PicOrderCntVal = PicOrderCntMsb + slice_pic_order_cnt_lsb
```

In the case of the example illustrated with respect to Table 5 and Table 6, PicOrderCntVal may be derived as follows:
  When the current picture is not an IRAP picture or the current picture does not have slice_pic_order_cnt_msb_ cycle signalled, the variables prevPicOrderCntLsb and prevPicOrderCntMsb are derived as follows:

Let prevTid0Pic be the previous picture in decoding order that has TemporalId equal to 0

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture is an IRAP picture or if log 2_max_pic_order_cnt_msb_cycle for the active SPS for this slice is present and is equal to 0 the variable PicOrderCntMsb is set equal to 0.

Otherwise if the slice of the current picture has slice_pic_order_cnt_msb_cycle signalled, the variable PicOrderCntMSB is set equal to slice_pic_order_cnt_msb_cycle multiplied by MaxPicOrderCntLsb.

Otherwise, PicOrderCntMsb is derived as follows:

if((slice_pic_order_cnt_lsb<prevPicOrderCntLsb)&&
  ((prevPicOrderCntLsb−slice_pic_order_cnt_lsb)
  =>=(Max PicOrderCntLsb/2)))

PicOrderCntMsb=prevPicOrderCntMsb−Max PicOrderCntLsb else if((slice_pic_order_lsb>prevPicOrderCntLsb)&&
  ((slice_pic_order_lsb−prevPicOrderCntLsb)>
  (Max PicOrderCntLsb/2)))

PicOrderCntMsb=prevPicOrderCntMsb−Max PicOrderCntLsb else

PicOrderCntMsb=prevPicOrderCntMsb

PicOrderCntVal is derived as follows:

PicOrderCntVal=PicOrderCntMsb+slice_pic_order_cnt_lsb

If slice_pic_order_cnt_msb_signaling_present is equal to 1 the value of PicOrdetCntVal shall be in the range of $-2^{(log\ 2\_max\_pic\_order\_cnt\_lsb\_minus4+log\ 2\_max\_pic\_order\_cnt\_msb\_cycle+3)}$ to $2^{(log\ 2\_max\_pic\_order\_cnt\_lsb\_minus4+log\ 2\_max\_pic\_order\_cnt\_msb\_cycle+3)}-1$, inclusive.

Otherwise, the value of PicOrderCntVal shall be in the range of $-2^{31}$ to $2^{31}-1$, inclusive.

In another example, if in a coded video sequence if slice_pic_order_cnt_msb_cycle is ever signaled, the value of PicOrderCntVal shall be in the range of $-2^{(log\ 2\_max\_pic\_order\_cnt\_lsb\_minus4+log\ 2\_max\_pic\_order\_cnt\_msb\_cycle+3)}$ to $2^{(log\ 2\_max\_pic\_order\_cnt\_lsb\_minus4+log\ 2\_max\_pic\_order\_cnt\_msb\_cycle+3)}-1$ inclusive.

Otherwise, the value of PicOrderCntVal shall be in the range of $-2^{31}$ to $2^{31}-1$, inclusive.

In yet another example, the otherwise part of the statements above may use a different value than the value of $2^{31}$. For example, the $2^{31}$ may be replaced in the otherwise part above with some other value, such as $2^{48}$ or $2^{64}$ or $2^{16}$, etc.

Further, in one example, an Instantaneous decoding refresh (IDR) picture may be described as an IRAP picture which does not refer to any pictures other than itself for inter prediction in its decoding process and is the first picture of a coded video sequence in decoding order.

As described above, a picture may be partitioned into slices and/or tiles, where a slice includes a sequence of CTUs in raster scan order and where a tile is a sequence of CTUs corresponding to a rectangular area of a picture. As described above, a slice may include one or more tiles. Further, there may be cases where the same grouping of CTUs (e.g., a group CTUs covering a rectangular area of a picture) may be classified as a slice or as a tile. "Tiles groups for VVC," 12th Meeting of ISO/IEC JTC1/SC29/WG11 3-12 Oct. 2018, Macao, C N, document JVET-L0415-v1, which is referred to herein as JVET-L0415, describes where slices are required to include an integer number of complete tiles instead of including an integer number of complete CTUs. As such, in JVET-L0415, the raster-scan CTU slices, which are not a rectangular region of a picture, are no longer supported and the name slice is changed to tile group. JVET-L0415 retains the structure of a slice header, but refers to it as a tile group header, replaces slice address with a tile group address in the tile group header, adds a syntax element num_tiles_in_tile_group that specifies the number of tiles in a tile group, and removes the end of slice flag syntax element; instead, the end of the tile group is given by the tile group address and num_tiles_in_tile_group. Although the techniques described herein are described above with respect to slices, the techniques described herein are applicable to cases where a slice is restricted to include an integer number of complete tiles. That is, the techniques described herein for indicating a picture order count value may be incorporated into techniques where a slice includes tile groups.

For example, Table 11 and Table 12 illustrate an examples of a tile group header syntax indicating a picture order count value according to the techniques herein.

TABLE 11

|  | Descriptor |
|---|---|
| tile_group_header( ) { |  |
|   tile_group_pic_parameter_set_id | ue(v) |
|   tile_group_pic_order_cnt_lsb | u(v) |
|   if(NumTilesInPic > 1 ) { |  |
|     tile_group_address | u(v) |
|         num_tiles_in_tile_group_minus1 | ue(v) |
|   } |  |
|   tile_group_type | ue(v) |
|   if ( tile_group_type != I ) { |  |
|     log2_diff_ctu_max_bt_size | ue(v) |
|     if( sps_sbtmvp_enabled_flag ) { |  |
|       sbtmvp_size_override_flag | u(1) |
|       if( sbtmvp_size_override_flag ) |  |
|         log2_sbtmvp_active_size_minus2 | u(3) |
|     } |  |
|     if( sps_temporal_mvp_enabled_flag ) |  |
|       tile_group_temporal_mvp_enabled_flag | u(1) |
|     if( tile_group_type = = B ) |  |
|       mvd_l1_zero_flag | u(1) |
|     if( tile_group_temporal_mvp_enabled_flag ) { |  |
|       if( tile_group_type = = B ) |  |
|         collocated_from_l0_flag | u(1) |
|     } |  |
|     six_minus_max_num_merge_cand | ue(v) |
|   } |  |
|   dep_quant_enabled_flag | u(1) |
|   if( !dep_quant_enabled_flag ) |  |
|     sign_data_hiding_enabled_flag | u(1) |
|   if( num_tiles_in_tile_group_minus1 > 0 ) { |  |
|     offset_len_minus1 | ue(v) |
|     for( i = 0; i < num_tiles_in_tile_group_minus1; i++ ) |  |
|       entry_point_offset_minus1[ i ] | u(v) |
|   } |  |
|   byte_alignment( ) |  |
| } |  |

TABLE 12

| | Descriptor |
|---|---|
| tile_group_header( ) { | |
|   tile_group_pic_parameter_set_id | ue(v) |
|   if(NumTilesInPic > 1 ) { | |
|     tile_group_address | u(v) |
|       num_tile_in_tile_group_minus1 | ue(v) |
|   } | |
|   tile_group_type | ue(v) |
|   tile_group_pic_order_cnt_lsb | u(v) |
|   if ( tile_group_type != I ) { | |
|     log2_diff_ctu_max_bt_size | ue(v) |
|     if( sps_sbtmvp_enabled_flag ) { | |
|       sbtmvp_size_override_flag | u(1) |
|       if( sbtmvp_size_override_flag ) | |
|         log2_sbtmvp_active_size_minus2 | u(3) |
|     } | |
|     if( sps_temporal_mvp_enabled_flag ) | |
|       tile_group_temporal_mvp_enabled_flag | u(1) |
|     if( tile_group_type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     six_minus_max_num_merge_cand | ue(v) |
|   } | |
|   dep_quant_enabled_flag | u(1) |
|   if( !dep_quant_enabled_flag ) | |
|     sign_data_hiding_enabled_flag | u(1) |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[ i ] | u(v) |
|   } | |
|   byte_alignment( ) | |
| } | |

With respect to Tables 11 and 12, the semantics of various syntax elements may be as follows:

When present, the value of the tile group header syntax element tile_group_pic_parameter_set_id shall be the same in all tile group headers of a coded picture.

tile_group_pic_parameter_set_id specifies the value of pps_pic_parameter_set_id for the PPS in use. The value of tile_group_pic_parameter_set_id shall be in the range of 0 to 63, inclusive.

tile_group_pic_order_cnt_lsb specifies the picture order count modulo MaxPicOrderCntLsb for the current picture. The length of the group_pic_order_cnt_lsb syntax element is log 2_max_pic_order_cnt_lsb_minus4+4 bits. The value of the tile_group_pic_order_cnt_lsb shall be in the range of 0 to MaxPicOrderCntLsb−1, inclusive.

In another example:

tile_group_pic_order_cnt_lsb specifies the picture order count modulo MaxPicOrderCntLsb for the picture this tile group belongs to. The length of the tile_group_pic_order_cnt_lsb syntax element is log 2max_pic_order_cnt_lsb_minus4+4 bits. The value of the tile_group_pic_order_cnt_lsb shall be in the range of 0 to MaxPicOrderCntLsb−1, inclusive.

In another example, tile_group_pic_order_cnt_lsb syntax element may be called some other name. For example tile_group_pic_order_cnt_lsb may be called pic_order_cnt_lsb. Or tile_group_pic_order_cnt_lsb may be called tile_set_pic_order_cnt_lsb. Or some other name may be used for tile_group_pic_order_cnt_lsb.

tile_gronp_address specifies the tile address of the first tile in the tile group. The length of tile group address is Ceil(Log 2 (NumTilesInPic)) bits. The value of tile group address shall be in the range of 0 to NumTilesInPic−1, inclusive, and the value of tile group address shall not be equal to the value of tile_group_address of any other coded tile group NAL unit of the same coded picture. When tile_group_address is not present it is inferred to be equal to 0.

num_tiles_in_tile_group_minus1 plus 1 specifies the number of tiles in the tile group. The value of num_tiles_in_tile_group_minus1 shall be in the range of 0 to NumTilesInPic−1, inclusive. When not present, the value of num_tiles_in_tile_group_minus1 is inferred to be equal to 0.

tile_group_type specifies the coding type of the tile group according to Table 13.

TABLE 13

| tile_group_type | Name of tile_group_type |
|---|---|
| 0 | B (B tile group) |
| 1 | P (P tile group) |
| 2 | I (I tile group) |

When nal_unit_type is equal to IRAP_NUT, i.e., the picture is an IRAP picture, tile_group_type shall be equal to 2.

log 2_diff_ctu_max_bt_size specifies the difference between the luma CTB size and the maximum luma size (width or height) of a coding block that can be split using a binary split. The value of log 2_diff_ctu_max_bt_size shall be in the range of 0 to Ctb Log 2SizeY−MinCb Log 2SizeY, inclusive.

When log 2_diff_ctu_max_bt_size is not present, tire value of log 2_diff_ctu_max_bt_size is inferred to be equal to 2.

The variables Min Qt Log 2SizeY, Max Bt Log 2SizeY, MinBt Log 2SizeY, MaxTt Log 2SizeY, MinTt Log 2SizeY, MaxBtSizeY, MinBtSizeY, MaxTtSizeY, MinTtSizeY and MaxMtdDepth are derived as follows:

Min Qt Log 2SizeY=(tile_group_type==1)? Min Qt Log 2SizeIntraY:Min Qt Log 2SizeInterY Max Bt Log 2SizeY=Ctb Log 2SizeY−log 2diff_ctu_max_bt_size Min Bt Log 2SizeY=Min Cb Log 2SizeY Max Tt Log 2SizeY=(tile_group_type==I)?5:6

Min Tt Log 2SizeY=Min Cb Log 2SizeY

Min Qt SizeY=1<<Min Qt Log 2SizeY

Max BtSizeY=1<<Max Bt Log 2SizeY

Min BtSizeY=1<<Min Bt Log 2SizeY

Max TtSizeY=1<<Max Tt Log 2SizeY

Min TtSizeY=1<<Min Tt Log 2SizeY

Max MttDepth=(tile_group_type==I)?max_mtt_hierarchy_depth_intra_tile_groups:max_mtt_hierarchy_depth_inter_tile_groups sbtmvp_size_override_flag equal to 1 specifies that the syntax element log 2_sbtmvp_active_size_minus2 is present for the current tile group. sbtmvp_size_override_flag equal to 0 specifies that die syntax element log 2_atmvp_active_size_minus2 is not present and log 2_sbtmvp_size_active_minus2 is inferred to be equal to log 2 sbtmvp_default_size_minus2.

log 2_sbtmvp_active_size_minus2 plus 2 specifies the value of the subblock size that is used for deriving the motion parameters for the subblock-based TMVP of the current tile group. When log 2_sbtmvp_size_active_minus2 is not present, it is inferred to be equal to log 2_sbtmvp_default_size_minus2. The variable is derived as follows:

Log 2SbtmvpSize=log 2 sbtmvp_size_active_minus2+2 tile_group_temporal_mvp_enabled_flag specifies whether temporal motion vector predictors can be used for inter prediction. If tile_group_temporal_mvp_enabled_flag is equal to 0, the syntax elements of the current picture shall be constrained such that no temporal motion vector predictor is used in decoding of the current picture. Otherwise (tile_group_temporal_mvp_enabled_flag is equal to 1), temporal motion vector predictors may be used in decoding of the current picture. When not present, the value of tile_group_temporal_mvp_enabled_flag is inferred to be equal to 0.

mvd_l1_zero_flag equal to 1 indicates that the mvd_coding(x0, y0, 1) syntax structure is not parsed and MvdL1[x0][y0][compIdx] is set equal to 0 for compIdx= 0 . . . 1. mvd_l1_zero_flag equal to 0 indicates that the mvd_coding(x0, y0, 1) syntax structure is parsed.

collocated_from_l0_flag equal to 1 specifies that the collocated picture used for temporal motion vector prediction is derived from reference picture list 0. collocated_from_l0_flag equal to 0 specifies that the collocated picture used for temporal motion vector prediction is derived from reference picture list 1. When collocated_from_l0_flag is not present, it is inferred to be equal to 1.

six_minus_max_num_merge_cand specifies the maximum number of merging motion vector prediction (MVP) candidates supported in the tile group subtracted from 6. The maximum number of merging MVP candidates, MaxNumMergeCand is derived as follows:

Max NumMergeCand=6−six_minus_max_num_merge_cand

The value of MaxNumMergeCand shall be in the range of 1 to 6, inclusive.

dep_quant_enabled_flag equal to 0 specifies that dependent quantization is disabled, dep_quant_enabled_flag equal to 1 specifies that dependent quantization is enabled.

sign_data_hiding_enabled_flag equal to 0 specifies that sign bit hiding is disabled, sign_data_hiding_enabled_flag equal to 1 specifies that sign bit hiding is enabled. When sign_data_hiding_enabled_flag is not present, it is inferred to be equal to 0.

offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The tile group data that follow the tile group header consists of num_tiles_in_tile_group_minus+1 subsets, with subset index values ranging from 0 to num_tiles_in_tile_group_minus1, inclusive. The first byte of the tile group data is considered byte 0. When present, emulation prevention bytes that appear in the tile group data portion of the coded tile group NAL unit are counted as part of the tile group data for purposes of subset identification. Subset 0 consists of bytes 0 to entry_point_offset_minus1[0], inclusive, of the coded tile group data, subset k, with k in the range of 1 to num_tiles_in_tile_group_minus1−1, inclusive, consists of bytes firstByte[k] to lastByte[k], inclusive, of the coded tile group data with firstByte[k] and lastByte[k] defined as:

$$firstByte[k] = \sum_{e=1}^{k}(\text{entry\_point\_offset\_minus } 1[n-1] + 1)$$

$$lastByte[k] = firstByte[k] + \text{entry\_point\_offset\_minus1}[k]$$

The last subset (with subset index equal to num_tiles_in_tile_group_minus1) consists of the remaining bytes of the coded tile group data.

Each subset shall consist of all coded bits of all CTUs in the tile group that are within the same tile.

In the case of the example illustrated with respect to Table 11 and Table 12, PicOrderCntVal may be derived as follows:

Output of this process is PicOrderCntVal, the picture order count of the current picture. Each coded picture is associated with a picture order count variable, denoted as PicOrderCntVal.

In another example:

Each tile group is associated with a picture order count variable, denoted as PicOrderCntVal.

In another example:

Each tile group of a coded picture is associated with a picture order count variable, denoted as PicOrderCntVal.

When the current picture is not an IRAP picture, the variables prevPicOrderCntLsb and prevPicOrderCntMsb are derived as follows:

Let prevTid0Pic be the previous picture in decoding order that has Temporal Id equal to 0.

The variable prevPicOrderCntLsb is set equal to tile_group_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture is an FRAP picture, PicOrderCntMsb is set equal to 0.

Otherwise, PicOrderCntMsb is derived as follows:

```
if( ( tile_group_pic_order_cnt_lsb < prevPicOrderCntLsb ) &&
    ( ( prevPicOrderCntLsb − tile_group_pic_order_cnt_lsb ) >=
( MaxPicOrderCntLsb / 2 ) ) )
  PicOrderCntMsb = prevPicOrderCntMsb + MaxPicOrderCntLsb
else if( (tile_group_pic_order_cnt_lsb > prevPicOrderCntLsb ) &&
    ( ( tile_group_pic_order_cnt_lsb − prevPicOrderCntLsb.) >
( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:

PicOrderCntVal=PicOrderCntMsb+tile_group_pic_order_cnt_lsb

The value of PicOrderCntVal shall be in the range of $-2^{31}$ to $2^{31}-1$, inclusive.

In one CVS, the PicOrderCntVal values for any two coded pictures shall not be the same.

The function PicOrderCnt(picX) is specified as follows:

PicOrderCnt(picX)=PicOrderCntVal of the picture picX

The function DiffPicOrderCnt(picA, picB) is specified as follows:

DiffPicOrderCnt(picA,picB)=PicOrderCnt(picA)−PicOrderCnt(picB)

The bitstream shall not contain data that result in values of DifTPicOrderCnt(picA, picB) used in the decoding process that are not in the range of $-2^{15}$ to $2^{15}-1$, inclusive.

NOTE 2—Let X be the current picture and Y and Z be two other pictures in the same CVS, Y and Z are considered to be in the same output order direction from X when both DiffPicOrderCnt(X, Y) and DifPicOrderCnt(X, Z) are positive or both are negative.

In this manner, source device 102 represents an example of a device configured to determine a picture order count most significant bit cycle value, signal a flag in a parameter set indicating the presence of syntax in a slice header indicating a picture order count most significant bit cycle value, and signal values for syntax elements in a slice header indicating a picture order count most significant bit cycle value.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Data decapsulator 123 may be configured to receive and parse any of the example parameter sets described herein.

Video decoder 124 may include any device configured to receive a bitstream (e.g., a MCTS sub-bitstream extraction) and/or acceptable variations thereof and reproduce video data therefrom. Display 126 may include any device configured to display video data. Display 126 may include one of a variety of display devices such as a liquid crystal display (LCD), a plasma display, an organic light emitting diode (OLED) display, or another type of display. Display 126 may include a High Definition display or an Ultra High Definition display. It should be noted that, although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
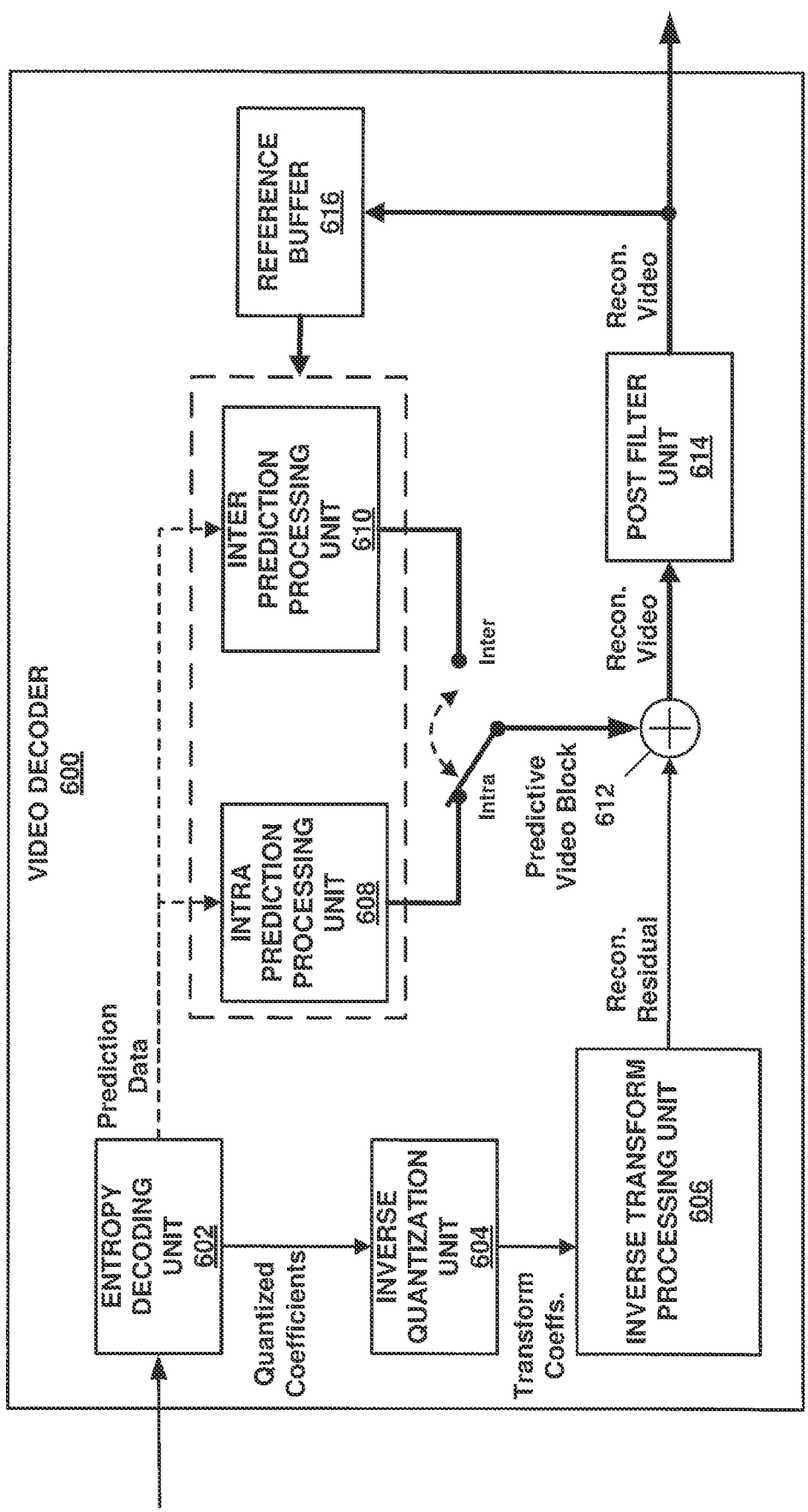
FIG. 6 is a block diagram illustrating an example of a video decoder that may be configured to decode video data, according to an implementation of the present disclosure.

FIG. 6 is a block diagram illustrating an example of a video decoder that may be configured to decode video data according to one or more techniques of this disclosure. In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-10. Video decoder 600 may perform video decoding based on the values of parsed syntax elements. For example, different video decoding techniques may be performed based on whether a picture is of a particular type.

In the example illustrated in FIG. 6, video decoder 600 includes an entropy decoding unit 602, inverse quantization unit 604, inverse transform processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit 604 and inverse transform processing unit 606 receive a quantization parameter, quantized coefficient values, transform data, and prediction data from entropy decoding unit 602 and outputs reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (e.g., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that, in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a flag in a parameter set indicating the presence of syntax in a slice header indicating a picture order count most significant bit cycle value, conditionally parse values for syntax elements in a slice header indicating a picture order count most significant bit cycle value based on the value of the flag in the parameter set and determine a picture order count most significant bit cycle value.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined coder/decoder (codec). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may include a general-purpose processor, a digital signal processor (DSP), an application-specific or general application integrated circuit (ASIC), a field-programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A video device to determine picture count information for decoding video pictures, the video device comprising:
   at least one processor; and
   at least one storage device coupled to the at least one processor and storing one or more computer-executable instructions which, when executed by the at least one processor, cause the video device to:

decode a picture order count (POC) most significant bit (MSB) first flag that indicates whether a POC MSB second flag is present;

decode, after determining that the POC MSB second flag is present, the POC MSB second flag that indicates whether a POC MSB cycle element is present; and decode, after determining that the POC MSB cycle element is present, the POC MSB cycle element that specifies a value of a POC MSB cycle, wherein:
the value of the POC MSB cycle is used to compute a POC MSB value that is combined with a POC least significant bit (LSB) value to produce a POC value used for decoding a first video picture, and
a length of the POC LSB value is based on a value of a maximum POC LSB minus four.

2. The video device of claim 1, wherein the POC MSB first flag is decoded from a sequence parameter for a sequence of video pictures comprising the first video picture.

3. The video device of claim 2, wherein the sequence parameter is included in a sequence parameter set (SPS) header associated with the sequence of video pictures.

4. The video device of claim 3, wherein the SPS header is specified in an SPS Raw Byte Sequence Payload (RBSP) syntax for the sequence of video pictures.

5. The video device of claim 2, wherein the POC MSB second flag and the POC MSB cycle element are associated with the first video picture in the sequence of video pictures.

6. The video device of claim 1, wherein the POC MSB second flag is a POC MSB present flag.

7. The video device of claim 6, wherein when a value of the POC MSB present flag is false, the POC MSB cycle element is not present.

8. The video device of claim 1, wherein the POC MSB second flag is associated with the first video picture.

9. The video device of claim 1, wherein the one or more computer-executable instructions, when executed by the at least one processor, further cause the video device to:
decode another POC MSB second flag that is associated with a second video picture and that indicates that another POC MSB cycle element is not present; and
forgo decoding the other POC MSB cycle element for decoding blocks of the second video picture after determining that the other POC MSB cycle element is not present.

10. The video device of claim 1, wherein:
the POC MSB cycle element is a variable-length element, and
a length of the POC MSB cycle element is based on a value of at least one other element.

* * * * *